United States Patent
Warrier et al.

(10) Patent No.: US 7,293,108 B2
(45) Date of Patent: Nov. 6, 2007

(54) GENERIC EXTERNAL PROXY

(75) Inventors: Ulhas S. Warrier, Beaverton, OR (US);
Saul Lewites, Hillsboro, OR (US);
Rameshkumar G. Illikkal, Portland, OR (US); Ramanan Ganesan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1047 days.

(21) Appl. No.: 09/811,011

(22) Filed: Mar. 15, 2001

(65) Prior Publication Data

US 2002/0133549 A1 Sep. 19, 2002

(51) Int. Cl.
*G06F 15/16* (2006.01)

(52) U.S. Cl. .............. 709/249; 709/202; 709/230

(58) Field of Classification Search .............. 709/249, 709/220–222, 230, 204; 370/465, 469
See application file for complete search history.

(56) References Cited

U.S. PATENT DOCUMENTS

| | | | | |
|---|---|---|---|---|
| 6,058,431 A * | 5/2000 | Srisuresh et al. | ........... | 709/245 |
| 6,360,265 B1 * | 3/2002 | Falck et al. | .............. | 709/227 |
| 6,381,646 B2 * | 4/2002 | Zhang et al. | .............. | 709/227 |
| 6,393,488 B1 * | 5/2002 | Araujo | .................. | 709/245 |
| 6,430,623 B1 * | 8/2002 | Alkhatib | ................ | 709/245 |
| 6,470,389 B1 * | 10/2002 | Chung et al. | .............. | 709/227 |
| 6,490,290 B1 * | 12/2002 | Zhang et al. | .............. | 370/401 |
| 6,493,349 B1 * | 12/2002 | Casey | .................... | 370/409 |
| 6,523,696 B1 * | 2/2003 | Saito et al. | ............... | 709/223 |
| 6,661,799 B1 * | 12/2003 | Molitor | ................... | 370/401 |
| 6,674,743 B1 * | 1/2004 | Amara et al. | .............. | 370/351 |
| 6,687,245 B2 * | 2/2004 | Fangman et al. | ......... | 370/356 |
| 6,697,864 B1 * | 2/2004 | Demirtjis et al. | ......... | 709/229 |
| 6,754,709 B1 * | 6/2004 | Gbadegesin | .............. | 709/227 |
| 2002/0103850 A1 * | 8/2002 | Moyer et al. | .............. | 709/202 |

OTHER PUBLICATIONS

RFC 2637, "Point-to-Point Tunneling Protocol", Hamzeh et al., Jul. 1999.*
RFC 2661, Layer Two Tunneling Protocol (L2TP), Townsley et al., Aug. 1999.*
RFC 2341, "Cisco Layer Two Forwarding (Protocol) L2F", Valencia, May 1998.*
George Tsirtsis et al., Internet-Draft, "NAT Bypass for End 2 End 'sensitive' applications", http://tools.ietf.org/html/draft-tsirtsis-nat-bypass-00, Jan. 1998.*

(Continued)

*Primary Examiner*—David Wiley
*Assistant Examiner*—J. Bret Dennison
(74) *Attorney, Agent, or Firm*—Blakely, Sokoloff, Taylor & Zafman LLP

(57) ABSTRACT

A first machine communicates with a second machine, using a protocol that sends the first machine's network configuration data in application data sent to the second machine, through a translating access point which translates network traffic from the first machine so as to originate from the access point. A network configuration server provides to the first machine network configuration data not subject to translation by the access point, which is sent to the second machine in the application data. The second machine communicates with the provided network configuration, and this communication is in turn made available to the first machine.

29 Claims, 6 Drawing Sheets

OTHER PUBLICATIONS

George Tsirtsis et al., Internet Draft, "Possible Mechanisms and Components for AATN", "http://tools.ietf.org/html/draft-tsirtsis-aatn-mech-00", Apr. 1998.*

P. Srisuresh et al., Internet-Draft, "Middlebox Communication Architecture and framework", "http://tools.ietf.org/html/draft-ietf-midcom-framework-03", Jul. 2001.*

Bernard Aboba, "IPSEC-NAT Compatibility Requirements," Nov. 20, 2000, IETF, INET XP002210309, <URL:ftp://ftp.cs.tu-berlin.de/pub/doc/internet-drafts/draft-aboba-nat-ipsec-03.txt>.

Raz et al., "An SNMP Application Level Gateway for Payload Address Translation," Oct. 2000, IETF, INET XP002210311, <URL:ftp.isi.edu/in-notes/rfc2962.txt>.

* cited by examiner

GENERIC EXTERNAL PROXY

FIELD OF THE INVENTION

The invention generally relates to networking, and, more particularly, to supporting usage of communication protocols that embed non-accessible network configuration data within network traffic.

BACKGROUND

Recent years has given significant advances in networking technology and reduced pricing, resulting in a significant buildup of networking infrastructure. Most businesses and households are interconnected through private and public networks, the most well known network being the Internet. Most networks now utilize the Transmission Control Protocol/Internet Protocol (TCP/IP) communication protocol, in which network locations are assigned a globally unique 32-bit numeric address typically presented in dot quad notation (four numbers each having values of zero to 255). TCP/IP network traffic is routed based on a destination IP address for the traffic.

Unfortunately, the explosive growth of the Internet has resulted in a shortage of available network addresses. To compensate, attempts have been made to share a single network address among multiple computers. One well-known example is Network Address Translation (NAT), which hides an internal network behind an access point in communication with an external network by routing network traffic through the access point. Since the internal network uses private network addresses the packets from this network are not routable in the Internet without translation. During operation, NAT modifies source IP address and ports of outgoing network traffic to map the traffic to an external or public address and a unique NAT port. NAT also modifies destination IP address and port of incoming network traffic using the mapping of external address and unique NAT port back to the original internal address and port. NAT ignores network traffic not received in response to original outgoing network traffic, and incoming traffic to unmapped ports.

Network traffic translation performed by a translating access point such as a NAT gateway/router 102, firewall 108, or the like, is transparent to many applications. However, translations break protocols under certain circumstances, such as with audiovisual conferencing (e.g., International Telecommunication Union (ITU) standard H.323), IP Security (IPSec), end-to-end security models that cannot allow packet header alterations, and protocols that embed a machine's network address and/or communication port values as application data within network traffic, such as the File Transfer Protocol (FTP), multi-player network game protocols, etc.

For example, in FIG. 1, an H.323 client 110 inspects its network configuration and sends it to an H.323 gateway 118 as application data. Because H.323 client 110 is in a private network, the configuration indicated in the application data cannot be used by H.323 gateway 118 to access it from the Internet. That is, a translating access point modifies packet header data not application data. Therefore, the protocol fails because the protocol effectively reports the wrong information within the application data.

One proposed solution to this problem is the REALM specific IP (RSIP) protocol, an Internet Engineering Task Force (IETF) suggested revision to NAT. Assuming the International Organization for Standardization Open Systems Interconnection (ISO/OSI) model, networking protocol layers 3 and 4 are altered to support RSIP in every translating access point. An RSIP access point grants a client, e.g., a machine in network 100, resources (e.g., address, ports) in an external realm, e.g., network 104.

Unfortunately, RSIP (and related solutions) are expensive and impractical. To work properly, all translating access points have to be revised to support RSIP; this solution fails if an upstream non-supporting translating access point is reached.

BRIEF DESCRIPTION OF THE DRAWINGS

The features and advantages of the present invention will become apparent from the following detailed description of the present invention in which.

DETAILED DESCRIPTION

Figure 2:
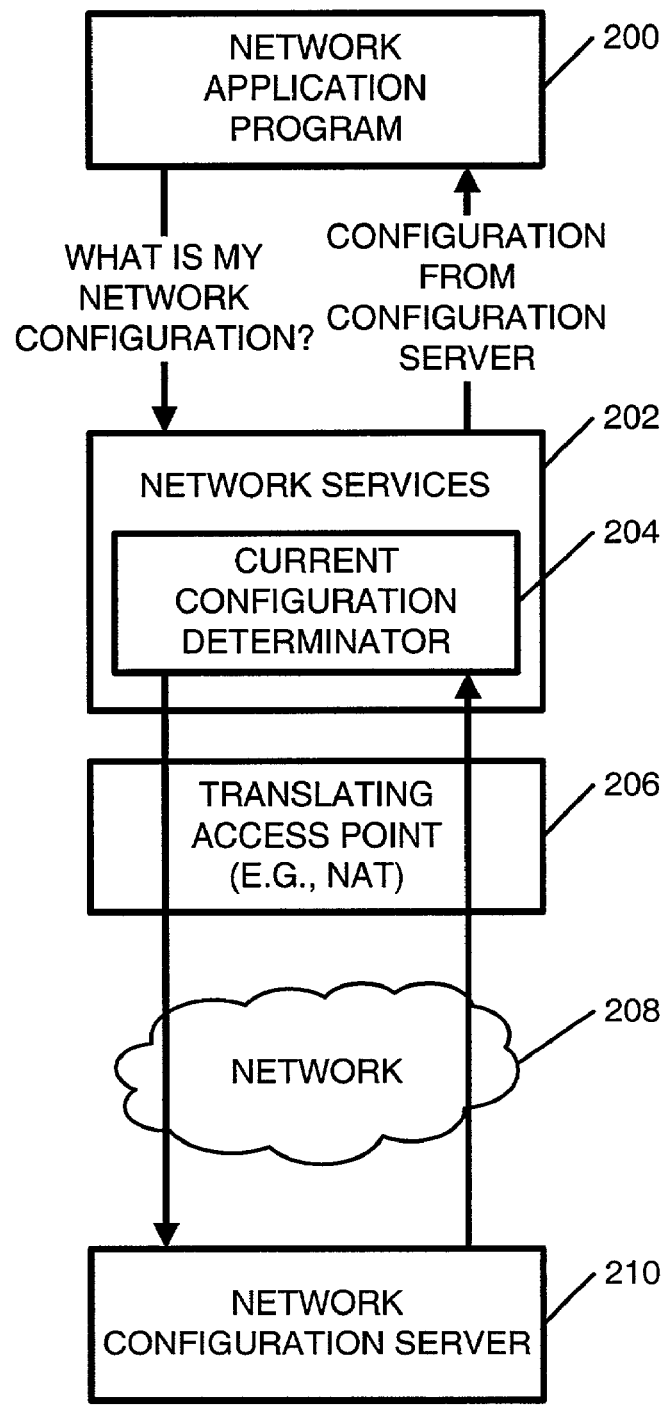
FIG. 2 is a generalized diagram, according to one embodiment, for supporting NAT with protocols that embed network configuration data in a NAT-inaccessible network traffic payload.

FIG. 2 is a generalized dataflow diagram, according to one embodiment, for supporting NAT with protocols that embed network configuration data in a NAT-inaccessible network traffic payload. This general overview is presented in more detail in the following figures.

As illustrated, a networking application program 200 is in communication with network services 202 provided by an operating system, e.g., a software and/or hardware based operating system providing services to the application program 200. During operation, a typical network application program requests the operating system to provide network configuration data the application program may use. In a TCP/IP environment, such a request typically comprises asking the operating system to identify the network address for the network interface (e.g., FIG. 6 item 618) address of a host system executing the application program, and an available communication port. If the host system is in a private network, this will be a non-routable network address that cannot be used in the Internet.

All network traffic from the application program 200 is assumed to pass through a translating access point 206 (translator), such as a NAT device or equivalent, before reaching network 208. Since translators do not alter application data, protocols that send network configuration data within application data fail to work from a private network. Consequently, to resolve the application program request for configuration data, a configuration determinator 204 component of the network services 202 contacts an external network configuration server 210. The server provides the determinator with network configuration data that can be used in a public network such as the Internet or equivalent network. For example, it may provide a network address and communication port of the server.

Figure 1:
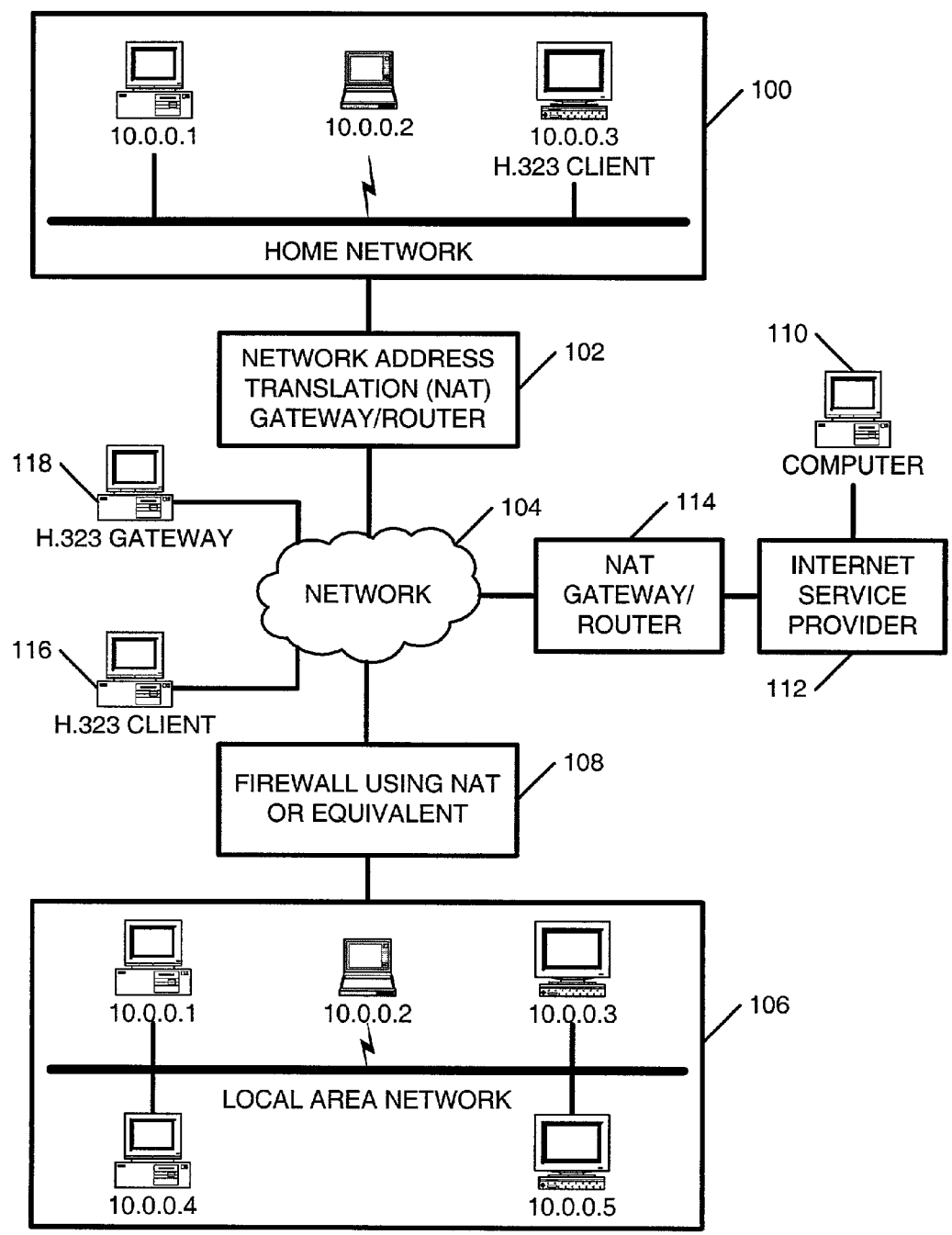
FIG. 1 illustrates a prior art network configuration of computing devices interconnected through the Internet.

When the determinator 204 receives this configuration data from the server 210, the network services 202 reports this data back to the requesting application program. When the application program embeds the configuration data within application data, a responsive network device (e.g., FIG. 1 H.323 client 116) issues responses that are sent in accord with the data provided by server 210. For example, assuming the server provided a network address and communication port of the server, the responsive network device sends responses to the server; the server then forwards the response for receipt and usage by the application program 200.

Figure 3:
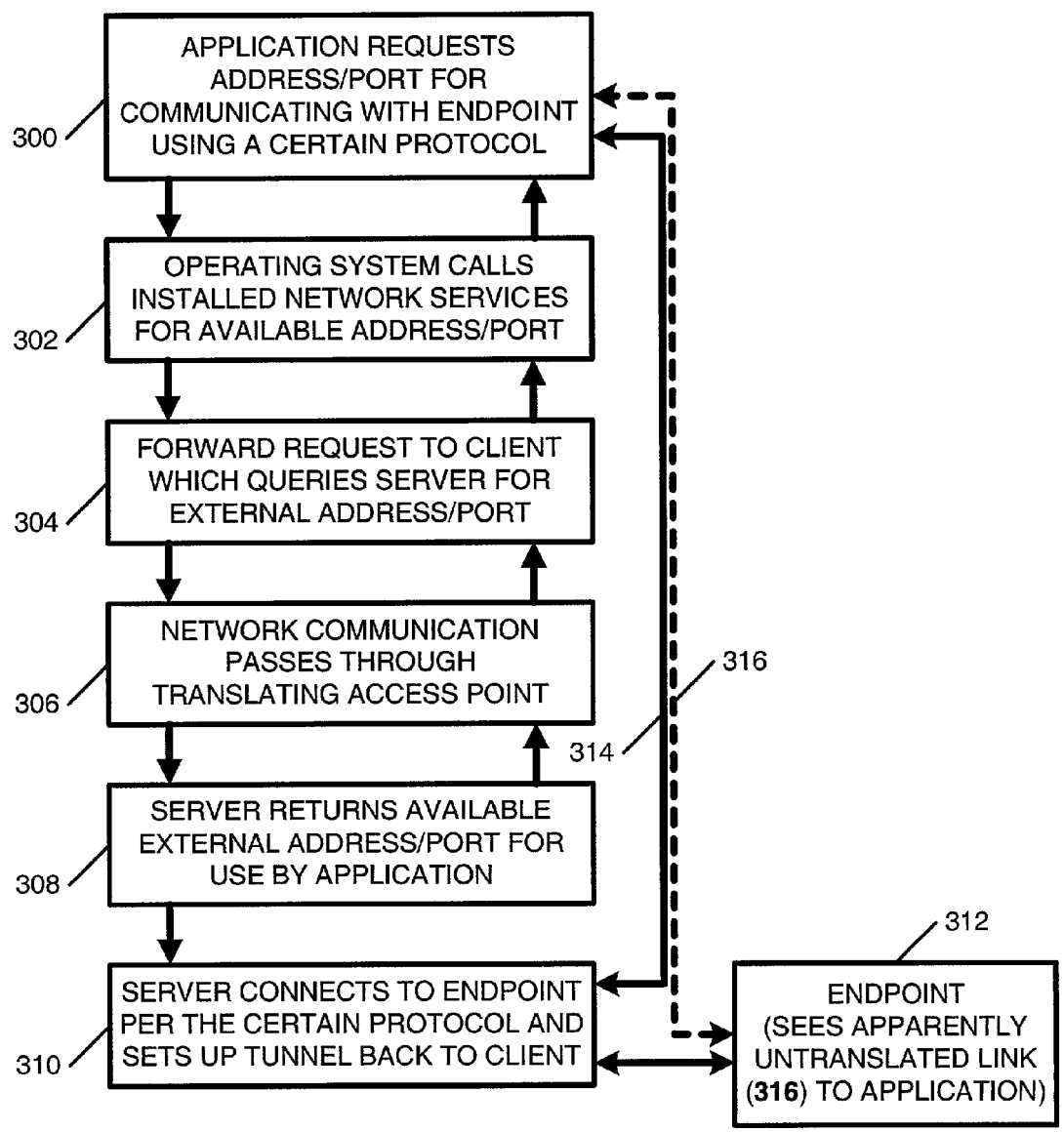
FIG. 3 is a flowchart illustrating, according to the FIG. 2 embodiment, communication between an application program and an endpoint that travels through a translating access point.

FIG. 3 is a flowchart illustrating, according to the FIG. 2 embodiment, communication between an application program and an endpoint that travels through a translating access point such as a NAT gateway/router (translator).

An application program utilizes a protocol to communicate with the endpoint. It is assumed the protocol is one that breaks because a private network address is included in application data, however the protocol may be a simple network connection. The application program requests 300 operating system network services to identify the network address of the application program's host, and to obtain an available (or specific) communication port. Typically, this request asks the operating system to identify the host's IP address and an available UDP or TCP port.

Figure 4:
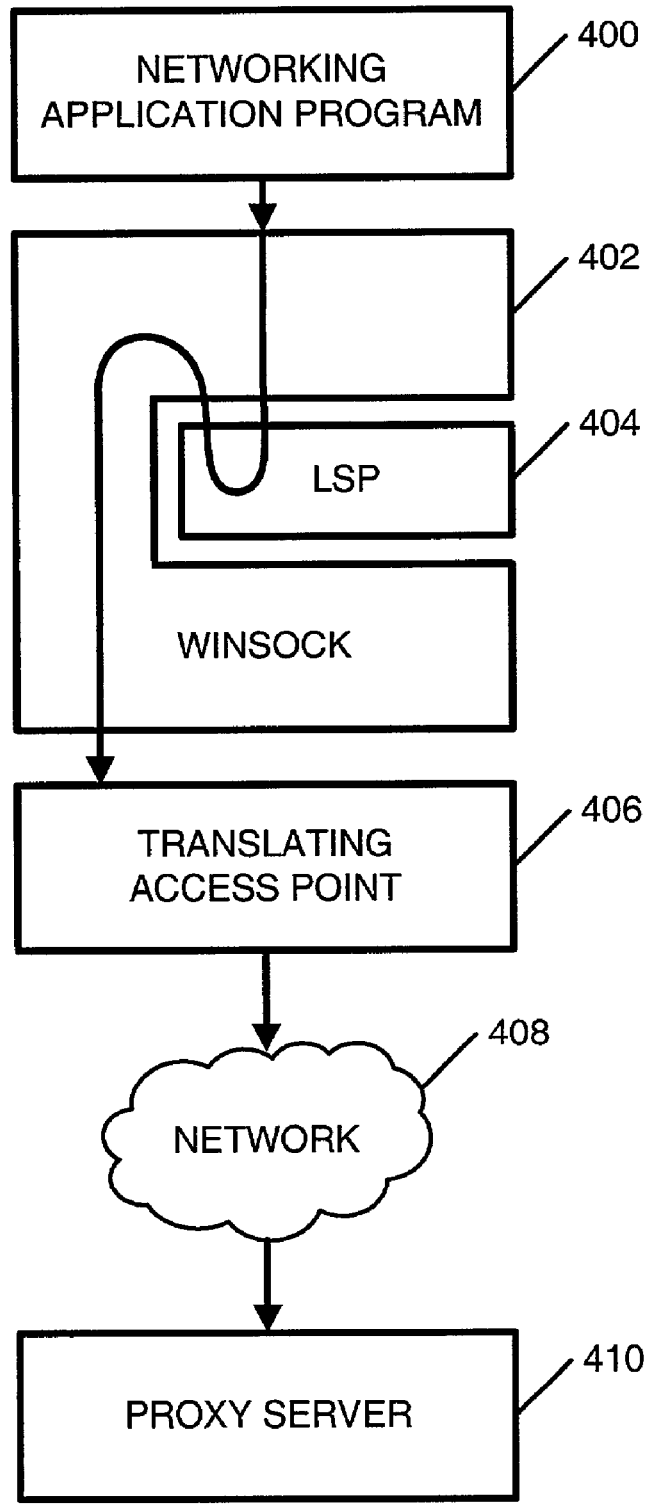
FIG. 4 illustrates one technique for implementing an embodiment of the FIG. 3 querying a server for an external address/port.

The operating system in turn calls 302 appropriate installed network services (provided in software and/or hardware) to resolve this request 300. Assuming the application program is not aware of network traffic translation by an access point, in one embodiment, network services are configured to forward the call 302 to a proxy client. One exemplary implementation for forwarding to the proxy client, discussed below with respect to FIG. 4, is a Layered Service Provider (LSP) within Microsoft Windows network services. (Please note that all marks used herein are the property of their respective owners.) However, it will be appreciated by one skilled in the art that other forwarding mechanisms may be used.

The proxy client in turn requests a network address and communication port from an external proxy server. As used in the specification and claims that follow, an external proxy server comprises a server with a network connection, e.g., an Internet connection, not subject to translation by an access point. For example, device 516 of FIG. 5 has a direct non-translated connection to the Internet. This request passes through 306 a translating access point. The external proxy server replies 308 to the proxy client with an available address and communication port. This reply also passes through the translating access point. However, since the external proxy server has a non-translated network connection, the proxy client reports to the requesting 300 application program an address and port that is external to and not affected by translation by an access point.

In one embodiment, the proxy client establishes a tunnel with the external proxy server. The external proxy server connects 310 to the endpoint and establishes a communication session with the endpoint in accordance with the protocol utilized by the application program. The tunnel can be used to pass 314 network traffic received at the address and port given 308 to the proxy client, and to carry network traffic from the application program to the endpoint.

The tunneling is transparent to both the application program and the endpoint because the application program believes the networking configuration values from the external server corresponds to values for the application program's host, and because the endpoint can directly communicate with the proxy server using the networking configuration values. Thus, based on such tunneling, a virtual direct link 316 unaffected by translating access points is created between the application program and endpoint.

FIG. 4 illustrates one technique for implementing an embodiment of the FIG. 3 querying 304 a server for an external address/port.

As illustrated, a Layered Service Provider (LSP) 404 is implemented in conjunction with the Microsoft Winsock Application Programming Interface (API) 406. In the illustrated embodiment, a Microsoft Winsock API is extended with the LSP, which configures Winsock to pass on network calls on to the LSP 404 for primary processing. For more information on LSPs, please see "Unraveling the Mysteries of Writing a Winsock 2 Layered Service Provider" by Hua et al., Microsoft Systems Journal (May 1999); Internet URL: msdn-microsoft-com/library/periodic/period99/layeredService-htm. (To prevent inadvertent hyperlinks, URL periods have been replaced with dashes).

In the illustrated embodiment, an application program 400 on a computing device (such as FIG. 1 item 110) is executed, where the application program utilizes a certain protocol to communicate with a peer (such as FIG. 1 item 116) that normally breaks when the protocol is used from behind a translating access point. For example, assume the application program identifies its host's network configuration, and sends the configuration through a translating access point 406 as application data sent to another computing device 116. The application program embeds configuration values that are not accessible over the network 104 by the peer device 116. Consequently, network traffic from the peer 116 directed to the embedded configuration data cannot be received by the application program 400.

In the illustrated embodiment, when the application program 400 calls on operating system network services to identify its host's network configuration, the operating system calls Winsock 402 services, which in turn calls the LSP 404. When control is passed to the LSP, the LSP obtains a network configuration not subject to translation, from an external proxy server 410. The LSP provides the configuration to Winsock, which in turn provides it to the application program. The application program may safely embed the LSP provided configuration in application data.

In one embodiment, when control is initially passed to the LSP, the LSP initially determines whether to accept the call, or to simply pass it back to the Winsock API to let it handle the call. This allows application programs that are "aware" of the translating access point 406 to operate without intervention. For such applications, the call to the LSP is passed back to Winsock for regular Winsock processing. However, if the application program is unaware of translation, the LSP calls an external proxy server 410 which returns to the LSP a network address and communication port not subject to translation. A tunnel is established between the LSP and the proxy server so that communication by other computing devices to the provided address/port can be transparently tunneled to the application program.

It will be appreciated by one skilled in the art that the invention is not operating system dependent; use of the Microsoft networking environment, and LSPs is for exemplary purposes due to broad familiarity with these environments. Other operating systems and network services may also be utilized. Also, some environments may utilize closed network services, e.g., an LSP type of construction is not available. In such environments, in one embodiment, calls to network services are intercepted and processed by a proxy client executing on the application program host. In an alternate embodiment, a virtual network interface and software router are used to receive network traffic which is routed through a physical network interface.

Figure 5:
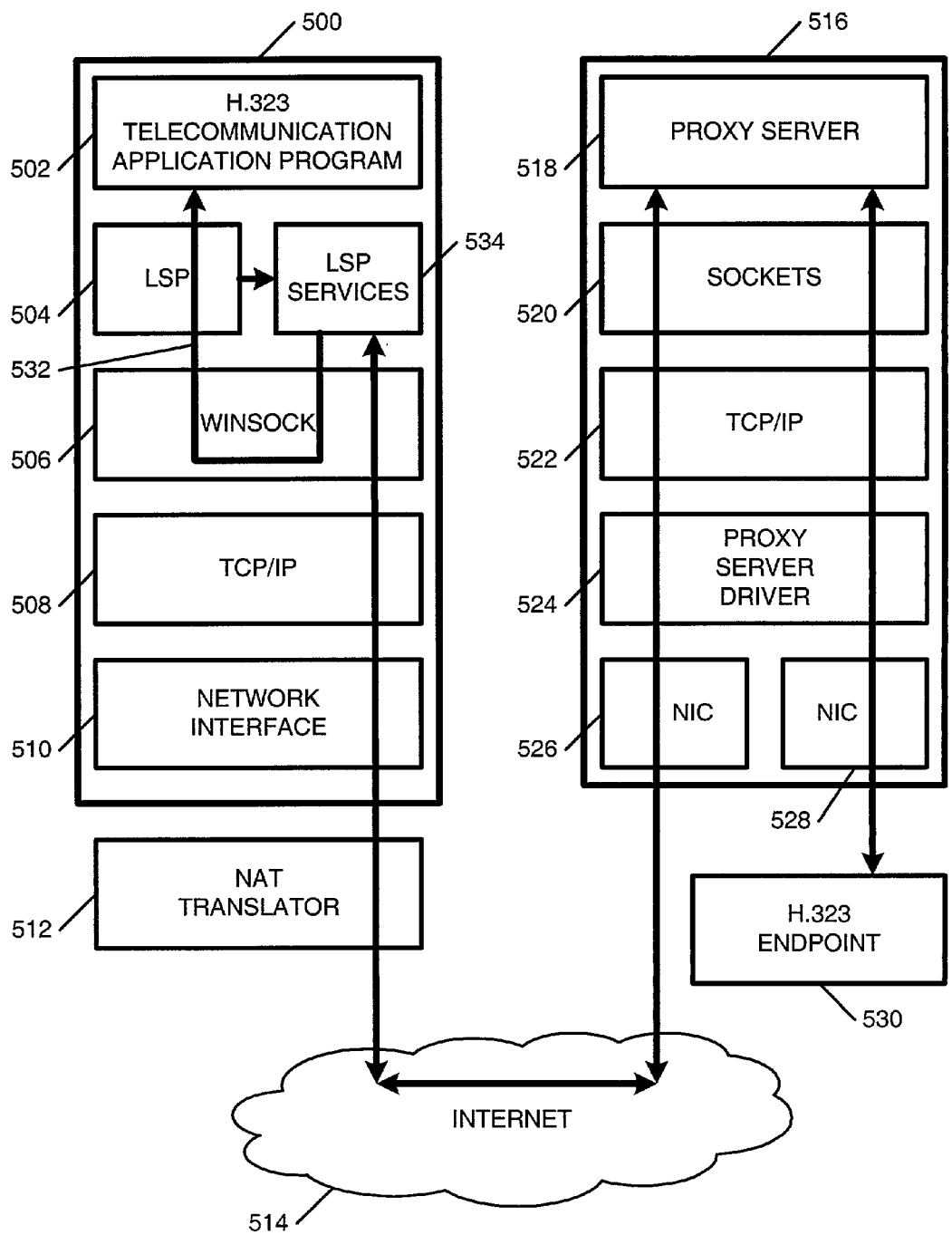
FIG. 5 is a diagram illustrating a specific application of the embodiment of FIG. 4 to an H.323 telecommunications application program.

FIG. 5 is a diagram illustrating a specific application of the embodiment of FIG. 4 to an H.323 telecommunications application program. It will be apparent to one skilled in the art that the illustrated embodiment is applicable to any protocol that inspects its host's network configuration and embeds this data in application data.

As illustrated, an exemplary computing device 500 comprises an H.323 application program 502, LSP network layer 504 (see also FIG. 4 item 404), Winsock (or equivalent) network layer 506, TCP/IP network layer 508, and network interface 510, communicates with an external network 514, such as the Internet, by way of a NAT translator 512. The computing device communicates with an external proxy server 518 embodied within an exemplary computing device 516 comprising the external proxy server, a sockets network layer 520 (e.g., Microsoft Winsock or the like) for interfacing with a TCP/IP network layer 522, and multiple network interfaces 526, 528 to handle the incoming and outgoing network traffic. In one embodiment, the computing device 516 further comprises an optional server driver (discussed below).

The computing device 500 utilizes an H.323 application program 502 to establish a telecommunication session with an H.323 endpoint 530. Rather than allowing the application program 502 to directly communicate with an external (with respect to the NAT translator 512) computing device, the application program is tricked instead into establishing a circular networking connection 532 through the LSP 504 and Winsock 506 network layers, rather than with the endpoint.

That is, when the application program starts 502, it queries its operating system for the network address of host computing device 500, and an available communication port. As discussed above in FIG. 2, the Winsock 506 passes this query to the LSP 504, which replies with address and port information retrieved from an external proxy server 518. As the application program communicates with the endpoint 530, the LSP receives the communication, forwards it to the proxy server, which in turn sends it to the endpoint. Responses from the endpoint are received by computing device 516, tunneled back to the LSP, which in turn provides it to the application program through the Winsock. In such fashion, the application program and endpoint believe they are directly communicating.

When the application program 502 sends call setup data for the endpoint, according to the H.323 protocol, the application program provides its host's network address and communication port to the endpoint 530 as application data sent to the endpoint. Since the LSP is providing the application program with configuration data from the proxy server 518, call setup is not affected by the translating access point 512. The application program waits for notification of a successful call setup.

In one embodiment, when the LSP forwards the call setup request to the external proxy server 518, the proxy server attempts to set up the call with the endpoint 530 using the network configuration given to the proxy client for the application program. If call setup is successful, the LSP 504 is notified of the success, and the LSP in turn notifies the application program. A tunnel is established by the proxy client to the external proxy server that is used for forwarding the telecommunication session between the computing device 500 and the endpoint 530. The proxy server may perform optimizations, such as compression, multiplexing, encryption, etc. to data transferred between the endpoint and the application program.

As noted above, computing device 516 may further comprise a proxy server driver 524. This driver may be used to offload processing by the proxy server so that the proxy server is only responsible for establishing a protocol with an endpoint, and after successful establishment, the driver 524 then maintains the communication tunnel between the application program and the endpoint. For example, in the illustrated example, once a telecommunications session has been established, the UDP network traffic for the H.323 audio communication can be tunneled by the proxy server driver to the proxy client within the computing device 500.

Figure 6:
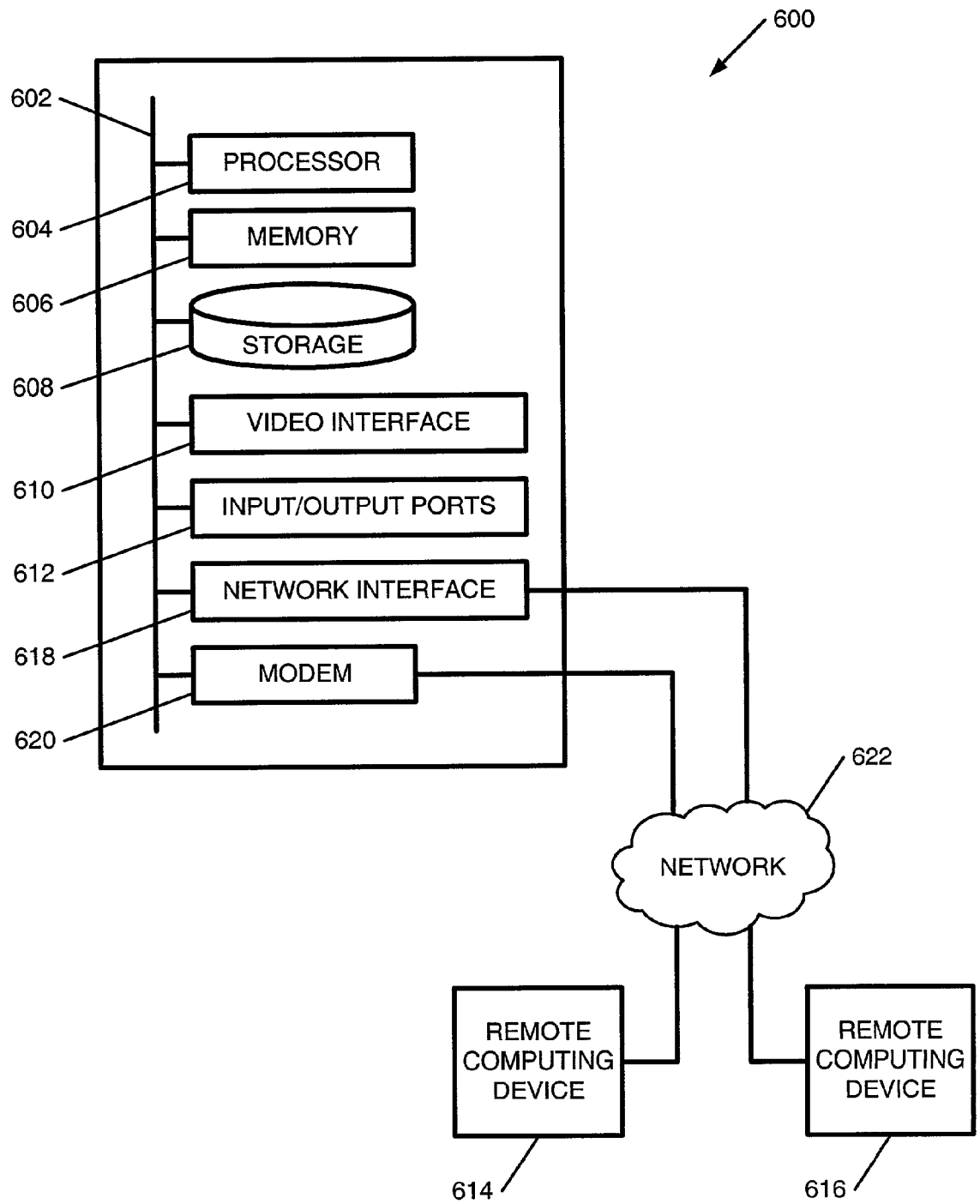
FIG. 6 illustrates a suitable computing environment in which certain aspects of the invention may be implemented.

FIG. 6 and the following discussion are intended to provide a brief, general description of a suitable computing environment in which certain aspects of the illustrated invention may be implemented. For example, an exemplary system for embodying the proxy client or proxy server of FIG. 2 includes a machine 600 having system bus 602 for coupling various machine components.

Typically, attached to the bus are non-programmable and programmable processors 604, a memory 606 (e.g., RAM, ROM), storage devices 608, a video interface 610, and input/output interface ports 612. The machine may also include embedded controllers, Programmable Logic Devices (PLD), Programmable Logic Arrays (PLA), Programmable Array Logic (PAL), Generic Array Logic (GAL), Field-Programmable Gate Arrays (FPGA), Application Specific Integrated Circuits (ASIC), computers, smart cards, or another machine, system, etc.

The machine is expected to operate in a networked environment using logical connections to one or more remote machines 614, 616 through a network interface 618, modem 620, or other communication pathway. Machines may be interconnected by way of a wired or wireless network 622 including an intranet, the Internet, local area networks, wide area networks, cellular, cable, laser, satellite, microwave, Blue Tooth, optical, infrared, or other carrier technology.

The invention may be described by reference to different high-level program modules and/or low-level hardware contexts that may be stored in memory 606 and/or storage devices 608. Program modules include procedures, functions, programs, components, data structures, and the like, for performing particular tasks or implementing particular abstract data types. One skilled in the art will realize that program modules and low-level hardware contexts can be interchanged with low-level hardware instructions, and are collectively referenced hereafter as "directives." One will further appreciate that directives may be recorded or carried in a compressed, encrypted, or otherwise encoded format without departing from the scope of this patent, even if the instructions must be decrypted, decompressed, compiled, interpreted, or otherwise manipulated prior to their execution or other utilization by the machine.

Memory 606, storage devices 608, and associated media, can store data and directives for the machine 600. Program modules may be implemented within a single machine, or processed in a distributed network environment, and stored in both local and remote memory. Memory and storage devices include hard-drives, floppy-disks, optical storage, magnetic cassettes, tapes, flash memory cards, memory sticks, digital video disks, biological storage, and the like, as well as wired and wireless transmission environments, such as network 622, over which directives may be delivered in the form of packets, serial data, parallel data, or other suitable transmission format.

Thus, for example, with respect to the illustrated embodiments, assuming machine 600 operates an H.323 telecommunication application program and the proxy client, then remote devices 614, 616 may respectively be a machine embodying the proxy server, and an H.323 communication endpoint. It will be appreciated that remote machines 614, 616 may be configured like machine 600, and therefore include many or all of the elements discussed for machine. It should also be appreciated that machines 600, 614, 616 may be embodied within a single device, or separate communicatively-coupled components, and may include or be embodied within routers, bridges, peer devices, web servers, etc.

Illustrated methods, and corresponding written descriptions thereof, are intended to illustrate machine-accessible media storing directives, or the like, which may be incorporated into single and multi-processor machines, portable computers, such as handheld devices including Personal Digital Assistants (PDAs), cellular telephones, and the like. Directives, when accessed, read, executed, loaded into, or otherwise utilized by a machine, causes the machine to perform the illustrated methods. The figures, written description, and claims may variously be understood as representing instructions taken alone, instructions as organized in a particular form, e.g., packet, serial, parallel, etc., and/or instructions together with their storage or carrier media.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for a first machine having a private network address on a private network to communicate with a second machine external to the private network via a network address translation (NAT) access point at the first machine, the method comprising:
   receiving at the first machine network configuration data from a network configuration server external to the private network;
   embedding the received network configuration data and a destination address associated with the second machine in a data portion of a packet;
   sending the packet from the first machine to the second machine via the network configuration server based at least in part on the destination address, the sending without subjecting the embedded configuration data to NAT by the NAT access point at the first; and
   receiving proxy server services from the network configuration server based on the embedded network configuration data.

2. The method of claim 1, wherein the network configuration data comprises a network address, and wherein receiving proxy server services from the network configuration server comprises establishing a tunnel between the first machine and the network configuration server for relaying to the first machine network traffic sent to the network address.

3. The method of claim 1, wherein first machine and the second machine communicate via one of an audio protocol, a visual protocol, and audiovisual protocol, and a telecommunication protocol.

4. A method for communicating through an access point coupling plural machines on a first network to a second machine on a second network by performing network address translation (NAT) on first network traffic, the method comprising:
   receiving at a server on the second network a request for an address from a first machine on the first network;
   in response to the request for an address, sending to the first machine a network address from the server on the second network;
   transmitting from the first machine to the access point a network packet having a header comprising a packet origin, and a data payload comprising the network address;
   performing at the access point a network address translation of the header of the packet without changing the allocated network address of the data payload;
   sending the data packet from the access point to the server; and
   providing at the server a proxy server service in support of the first machine communicating with the second machine, the providing based at least in part on the network address in the payload of the packet.

5. The method of claim 4, wherein providing a proxy server service at the server comprises:
   establishing a tunnel between the first machine and the server; and
   the first machine receiving, through the tunnel, network traffic sent to the network address.

6. The method of claim 5, wherein the access point performs selected ones of: network address translation, and port translation on the at least one network packet.

7. The method of claim 4, further comprising:
   providing a network address translation (NAT) based router between the first machine and the second machine to perform NAT translation on communication between said first and second machines.

8. The method of claim 7, wherein the NAT based router is the access point.

9. The method of claim 4, further comprising:
   communicatively coupling the server to the second network such that network traffic from the server reaches the second machine without translation.

10. The method of claim 9, wherein the second network is the Internet.

11. The method of claim 4, wherein the packet origin address is the first network address.

12. The method of claim 4, further comprising:
executing a networking application program, said program issuing the request for the address of the first machine, and storing said network address as the data payload;
wherein the networking application program is unaware of said translating.

13. The method of claim 4, wherein the first machine comprises:
a network interface communicatively coupled to the first network;
a first memory for storing an operating system providing network services; and
a second memory for storing a network driver communicatively coupling the network interface to said network services.

14. The method of claim 13, further comprising:
executing a networking application program which issues the request for the first address; and
the network driver providing the network address responsive to said networking application program request.

15. A method for a machine on an internal network to utilize a protocol embedding a machine network address within network traffic data when such traffic routes through an access point that performs network address translation on the machine network address, the method comprising:
receiving at an external server first network traffic from a network driver executing on the machine of the internal network;
allocating at the external server an external address on an external network;
sending the external address from the external server to the network driver of the first machine using a payload portion of a data packet; and
establishing a tunnel from the external server through the access point to the network driver to allow network traffic sent to the external address to be received by the network driver.

16. The method of claim 15, further comprising:
receiving second network traffic from an application program executing on the first machine, the second traffic including a data packet payload encoding an identified address determined by the application program for the first machine.

17. The method of claim 16, wherein the application program is a telecommunication program, the method further comprising:
contacting the external server on the external network, the contacting by the network driver;
initiating a call by said program to an endpoint;
notifying said server of said initiating;
establishing said call to the endpoint by said server;
notifying the network driver of success/failure of said establishing; and
notifying said program of said success/failure.

18. The method of claim 17, wherein:
the application program telecommunicates with the network driver; and
the endpoint telecommunicates with the server.

19. A method for a first machine on an local area network (LAN) to communicate with a wide area network (WAN) through an access point configured to perform network address translation (NAT) on LAN network traffic, the method comprising:
providing at the first machine layer-based network services including an application layer, a network driver layer, and a session layer, wherein a network driver of said network driver layer is called before said session layer;
executing at the first machine an application program configured to identify a first address of the first machine, embed said identified first address within network traffic data, and send said network traffic data to a communication endpoint on the WAN;
providing a WAN address to said application program to allow said application program to embed the WAN address within the network traffic data, the providing by the layer-based network services of the first machine; and
establishing a first communication session between said application program and said network driver, a second communication session between said network driver and a server, and a third communication session between the server and said communication endpoint.

20. The method of claim 19, further comprising:
contacting a server on the WAN to obtain the WAN address;
receiving a call setup from said application program for the endpoint;
establishing a call from the server to the communication endpoint;
connecting said call to said driver; and
transparently forwarding said call by said driver to the server.

21. The method of claim 19, wherein the session layer comprises the Microsoft Winsock Application Programming Interface.

22. The method of claim 19, wherein said network services are arranged according to the ISO/OSI model.

23. An apparatus for communicating through an access point coupling plural machines on a first network to a second machine on a second network by performing network address translation (NAT) on first network traffic, comprising a readable medium having instructions encoded thereon for execution by a processor, said instructions capable of directing the processor to perform:
receiving a request for an address from a first machine on the first network;
providing a network address to the first machine in response to the request;
receiving from the first machine via the access point a network packet having a data payload comprising the network address, the access point having performed a network address translation (NAT) of the packet without changing the allocated network address of the data payload; and
providing a proxy server service in support of the first machine communicating with the second machine, the providing based at least in part on the network address in the payload of the packet.

24. The apparatus of claim 23, wherein providing a proxy server service in support of the first machine communicating with the second machine comprises establishing a tunnel between the first machine and the server to transmit network traffic sent to the network address.

25. The apparatus of claim 23, wherein a network address translation (NAT) based router between the first machine and the second machine translates communication between said first and second machines.

26. The apparatus of claim 25, wherein the NAT based router is the access point.

27. A system for machines on an internal network to utilize protocols embedding machine network addresses within network traffic data when routing the network traffic through an access point that translates internal network addresses into a single address on an external network, the system comprising:
- receiving means for receiving first network traffic from a network driver executing on a first machine of the internal network;
- allocating means for allocating an external address on an external network;
- providing means for providing the external address to the network driver of the first machine using a payload portion of a data packet; and
- establishing means for establishing a tunnel through the access point to the network driver so that network traffic for the external address is received by the network driver.

28. The system of claim 27, further comprising:
- receiving means for receiving second network traffic from an application program executing on the first machine and a data payload encoding an identified address determined by the application program for the first machine.

29. The system of claim 28, wherein the application program is a telecommunication program, the system further comprising:
- means for contacting by the network driver of a call handling server on the external network, said call handling server performing said allocating the external address and establishing the tunnel;
- initiating means for initiating a call by said application program to an endpoint;
- notifying means for notifying said call handling server of said initiating;
- establishing means for establishing said call to the endpoint by said server;
- notifying means for notifying the network driver of success/failure of said establishing; and
- notifying means for notifying said application program of said success/failure.

* * * * *